No. 784,778. PATENTED MAR. 14, 1905.
M. J. BOUTTEAU.
PROCESS OF MAKING CATTLE FOOD CAKE.
APPLICATION FILED APR. 22, 1904.
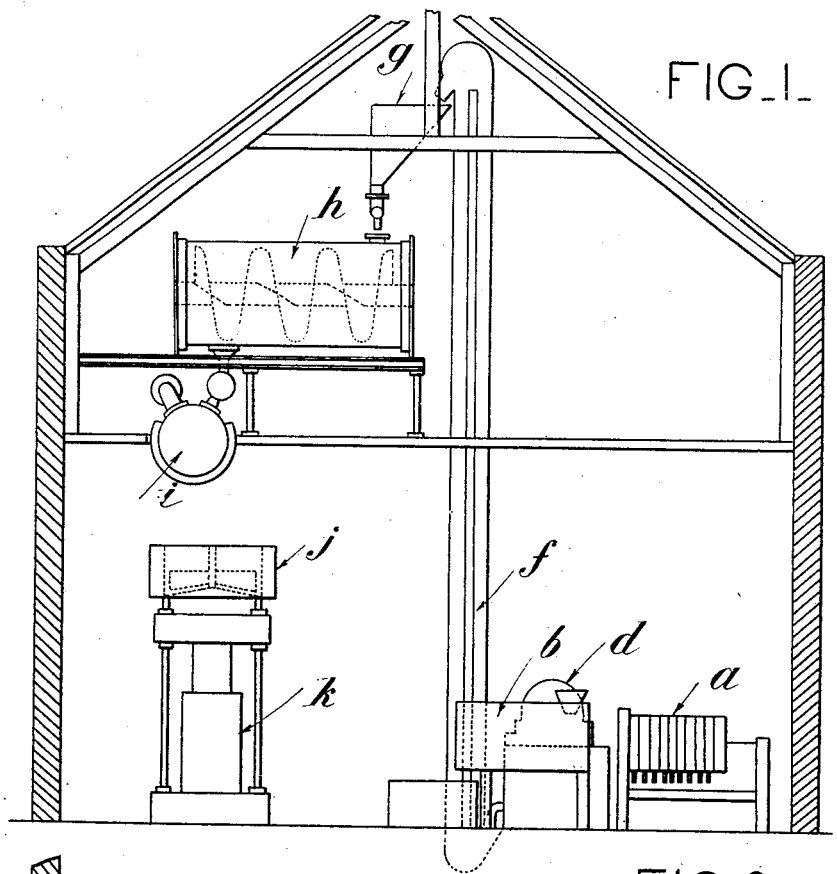
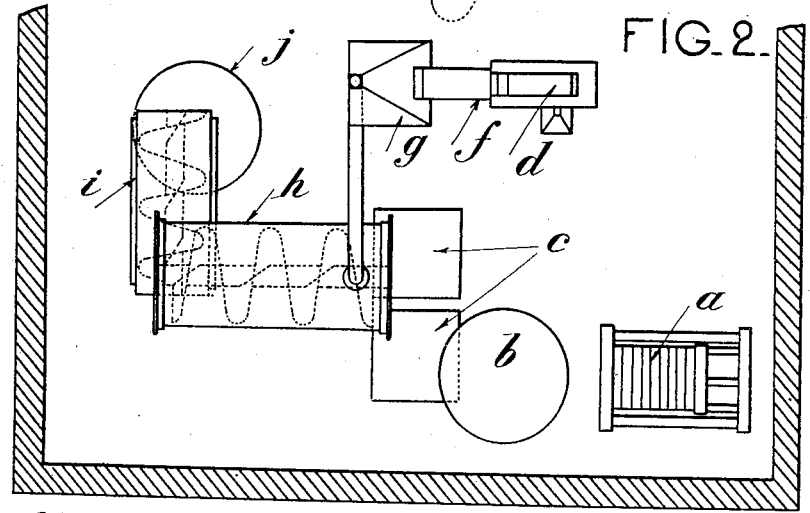

No. 784,778. Patented March 14, 1905.

UNITED STATES PATENT OFFICE.

MAURICE JULES BOUTTEAU, OF ANZIN, FRANCE.

PROCESS OF MAKING CATTLE-FOOD CAKE.

SPECIFICATION forming part of Letters Patent No. 784,778, dated March 14, 1905.

Application filed April 22, 1904. Serial No. 204,463.

*To all whom it may concern:*

Be it known that I, MAURICE JULES BOUTTEAU, a citizen of the Republic of France, and a resident of 7 Rue Verte, Anzin, in the Republic of France, have invented a new and useful Process of Making Cattle-Food Cake, of which the following is a specification.

My invention relates to a process for the manufacture of a product for the feeding of cattle which I intend calling "brewery-cake," and which is obtained by making a proper mixture, under the conditions hereinafter set forth, of molasses, dried malt-waste, barley-radicals, and pressed yeast. The proportions of these materials can vary within broad limits; but the following quantities which I prefer to employ give excellent results: To obtain about one hundred kilograms of my cakes at the end of the manufacture, I employ sixteen kilograms of molasses, thirty-two kilograms of dried malt-waste, thirty-two kilograms of barley-radicals, and forty kilograms of pressed yeast, which gives a total weight of one hundred and twenty kilograms, the difference of twenty kilograms disappearing during the manufacture.

The accompanying drawings represent a diagrammatic installation adapted for the above manufacture.

Figure 1 is an elevation view, and Fig. 2 a plan view, of the installation.

To manufacture the cakes, the beer-yeast is first taken as it comes from the brewery and is forced, by means of a pump, through ordinary filtering-presses $a$, essentially formed of hollow frames kept together by means of pressure-screws. These frames, covered with cloths of jute or cotton, allow the beer to filter and retain the yeast-cells, which are then gathered under the form of cakes. After each operation, which lasts about an hour, each frame is removed in order to extract the dry yeast. The beer obtained during this operation is delivered to the market after having been filtered and gasified. As to the cakes of dry yeast, they are then brought to a cooking-copper $b$, into which the molasses are added. Owing to the boiling, the yeast is neutralized. The mixture of yeast and molasses is then forced into a resting-tank $c$, from which it is then drawn to be employed in the following operations: The barley-radicals are separated from the dust that they have by means of a suitable sieve apparatus, and the malt-waste is dried in order to eliminate the water that it contains. The cleaned radicals and the dried malt-waste are then conducted to a grinder $d$, which is preferably of the Carter type. The flour resulting from the grinding is taken by the elevator $f$ to the upper story and is thrown into a hopper $g$, from where it is distributed to a mixing apparatus $h$. In this mixing apparatus is poured the liquid mixture of yeast and molasses which has been elevated by pumps. The whole is then intimately mixed in the mixing apparatus provided with a screw and passes in the state of paste in a drying apparatus $i$, having a steam-jacket and an inner rotary screw, which is adapted to scrape the walls.

The powdery product which comes out of the drying apparatus $i$ falls into a warming apparatus $j$, having a steam-jacket and a scraper adapted to bring successively the different parts in contact with the hot walls. The mass which is thus kept regularly hot is sent in suitable quantities to the hydraulic press $k$. The matter is generally arranged in a fixed cylinder so as to form superposed cakes separated one from the other by means of movable plates. Thus by a single shot a great number of cakes can be pressed, which after cooling are ready to be delivered to the market.

Having now described my invention, what I claim as new, and desire to secure by Letters Patent, is—

A process of making cattle-food cakes consisting in forcing beer-yeast through filtering-presses in order to obtain dry cakes of yeast, in heating said cakes of dry yeast with a suitable quantity of molasses, in grinding barley-radicals previously cleaned with dry malt-waste, in pouring the liquid mixture of yeast and molasses into the ground mixture of barley radicals and malt-waste, in mixing the whole while it is heated at a suitable temperature, and in pressing the mass in a hydraulic press in order to obtain cakes, substantially as and for the purpose set forth.

In witness whereof I have hereunto set my hand in presence of two witnesses.

MAURICE JULES BOUTTEAU.

Witnesses:
   DANIEL CHARATTE,
   HENRI LANDRIEUX.